(12) United States Patent
Chang

(10) Patent No.: US 11,253,815 B2
(45) Date of Patent: Feb. 22, 2022

(54) NOZZLE BLOCK, WET SCRUBBER DEVICE COMPRISING NOZZLE BLOCK, AND FUME HOOD HAVING WET SCRUBBER DEVICE

(71) Applicant: SAMIN SCIENCE CO., LTD, Gyeonggi-do (KR)

(72) Inventor: Hyo-Cheol Chang, Incheon (KR)

(73) Assignee: SAMIN SCIENCE CO., LTD, Gyeonggi-Do (KR)

( * ) Notice: Subject to any disclaimer, the term of this patent is extended or adjusted under 35 U.S.C. 154(b) by 576 days.

(21) Appl. No.: 16/302,866

(22) PCT Filed: Mar. 21, 2018

(86) PCT No.: PCT/KR2018/003241
§ 371 (c)(1),
(2) Date: Nov. 19, 2018

(87) PCT Pub. No.: WO2018/174529
PCT Pub. Date: Sep. 27, 2018

(65) Prior Publication Data
US 2021/0220774 A1    Jul. 22, 2021

(30) Foreign Application Priority Data

Mar. 22, 2017  (KR) .................. 10-2017-0036246
Mar. 22, 2017  (KR) .................. 10-2017-0036275

(51) Int. Cl.
| | |
|---|---|
| *B01D 53/78* | (2006.01) |
| *B01D 47/06* | (2006.01) |
| *B01F 3/04* | (2006.01) |
| *B01D 47/14* | (2006.01) |
| *A47L 11/30* | (2006.01) |

(52) U.S. Cl.
CPC .............. *B01D 53/78* (2013.01); *B01D 47/06* (2013.01); *B01F 3/04* (2013.01); *A47L 11/30* (2013.01); *B01D 47/14* (2013.01)

(58) Field of Classification Search
CPC ........... A47L 11/30; B01F 3/04; B01D 53/78; B01D 47/06
See application file for complete search history.

(56) References Cited

U.S. PATENT DOCUMENTS 7,770,254 B2 *   8/2010   Alexander .............. B08B 3/026
                                                                     15/321

FOREIGN PATENT DOCUMENTS

| JP | 2006-61858 A | 3/2006 |
|---|---|---|
| KR | 10-0663635 B1 | 1/2007 |
| KR | 10-0794208 B1 | 1/2008 |
| KR | 10-2010-0000552 A | 1/2010 |

(Continued)

OTHER PUBLICATIONS

International Search Report for PCT/KR2018/003241 dated Jun. 28, 2018.

*Primary Examiner* — Robert A Hopkins
(74) *Attorney, Agent, or Firm* — The PL Law Group, PLLC

(57) ABSTRACT

In a nozzle block, a fluid is uniformly sprayed over an entire housing inside through a spray nozzle with the rotation of a nozzle coupling part, thereby increasing a contact ratio of the fluid with contaminated gas and dramatically improving the purification efficiency. Additionally, a fluid for cleaning contaminated gas is allowed to flow opposite to a flow of contaminated gas, so that the contaminated gas and the fluid cancel out, and the contact ratio increases.

6 Claims, 15 Drawing Sheets

(56) References Cited

FOREIGN PATENT DOCUMENTS

| | | |
|---|---|---|
| KR | 10-1541890 B | 8/2015 |
| KR | 10-2016-0083681 A | 7/2016 |
| KR | 10-1669805 B1 | 10/2016 |

* cited by examiner (a)          (b)

NOZZLE BLOCK, WET SCRUBBER DEVICE COMPRISING NOZZLE BLOCK, AND FUME HOOD HAVING WET SCRUBBER DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/003241, filed Mar. 21, 2018, which claims priority to the benefit of Korean Patent Application Nos. 10-2017-0036246 filed on Mar. 22, 2017 and 10-2017-0036275 filed on Mar. 22, 2017 in the Korean Intellectual Property Office and, the entire contents of which are incorporated herein by reference.

TECHNICAL FIELD

The present disclosure relates to a nozzle block, a wet scrubber device including the nozzle block and a fume hood with the wet scrubber device, and more particularly, to a nozzle block for ejecting a fluid into a free space at a high speed, a wet scrubber device including the nozzle block for capturing solid, liquid or gas particles floating in contaminated gas using the fluid in the nozzle block, and a fume hood with the wet scrubber device.

BACKGROUND ART

Exhaust gas emitted in the chemical plant, steel industry and semiconductor fabrication process is highly toxic, explosive and corrosive, so it is harmful for human body, and when it is released in air without any treatment, it causes environmental pollution.

Accordingly, before releasing exhaust gas, a purification treatment process for reducing the content of harmful substances included in exhaust gas below the allowed concentration is necessarily required, and reducing the content of harmful substances below the allowed concentration is legally mandatory.

In the chemical plant, steel industry and semiconductor fabrication process as described above, a wet scrubber device is designed to reduce the content of harmful substances (gas including acid or alkali) included in exhaust gas, and is a device that forms a liquid membrane or droplets to purify gas contaminated by contact with dirty gas.

The wet scrubber device is used to treat dirt, odor and harmful gas at the same time, and in most cases, water is used for a purifying solution, but solvents may be used depending on the solubility of contaminants.

However, the conventional wet scrubber device commonly used has low removal efficiency in the harmful substance treatment process, failing to completely remove harmful substances, and accordingly harmful substances are released in air, causing environmental pollution.

Additionally, because the purifying solution is sprayed in one direction from a plurality of nozzles provided in a nozzle assembly that sprays the purifying solution, the purifying solution is not uniformly distributed over a wide area, resulting in the reduced contact ratio with contaminated gas.

The background art of the present disclosure is disclosed by Korean Patent No. 10-1541890 (Date of publication after issuance of the patent: Aug. 6, 2015) and Korean Patent Publication No. 10-2010-0000552 (Date of publication of the patent application: Jan. 6, 2010).

SUMMARY

The present disclosure is designed under the above-described background, and therefore the present disclosure is directed to providing a nozzle block that uniformly sprays a fluid over the entire housing inside through a spray nozzle with the rotation of a nozzle coupling part, thereby increasing a contact ratio of the fluid with contaminated gas and dramatically improving the purification efficiency.

The present disclosure is further directed to providing a wet scrubber device including a nozzle block that allows a fluid for cleaning contaminated gas to flow opposite to a flow of contaminated gas, so that the contaminated gas and the fluid cancel out, increasing a contact ratio, and a fume hood with the wet scrubber device.

To achieve the above-described object, an embodiment of the present disclosure provides a nozzle block including a support axis coupled to an inside of a housing, and having a water supply channel connected with a fluid supply part to transport a fluid supplied from the fluid supply part, a nozzle coupling part rotatably coupled to a lower end of the support axis, and having a fluid movement passage that is in communication with the water supply channel to transport the fluid, and a plurality of spray nozzles mounted in the nozzle coupling part in a radial direction, and having a spray passage that is in communication with the fluid movement passage to transport the fluid, and a spray port to spray out the fluid in the spray passage, wherein a spray propulsive force is generated by the fluid sprayed through the spray nozzle so that the nozzle coupling part rotates in one direction or opposite direction.

Additionally, in the present disclosure, the nozzle block further includes an upper friction reducing member interposed between the support axis and the nozzle coupling part to fix a position of the nozzle coupling part while supporting the rotating nozzle coupling part.

Additionally, in the present disclosure, the nozzle block further includes a nozzle coupling part cover coupled to the nozzle coupling part, surrounding the friction reducing member, to allow the fluid supplied from the fluid supply part to move to the spray nozzle while preventing leakage.

Additionally, in the present disclosure, the nozzle coupling part has a plurality of rotation inducing parts at a lower end, the rotation inducing parts being spaced apart along a circumferential direction and sloping at a same inclination angle as a rotation direction radially from a center axis part to rotate by rising air currents of contaminated gas discharged through the housing.

Additionally, in the present disclosure, the nozzle block further includes a lower friction reducing member interposed between the housing and the nozzle coupling part to fix a position of the nozzle coupling part while supporting the rotating nozzle coupling part.

Meanwhile, to achieve the above-described object, a wet scrubber device according to the present disclosure includes a body having a storage part in which a fluid is collected therein, one or more inlets in a lower part, through which contaminated gas is introduced, and an exhaust port in an upper part to collect and discharge the contaminated gas introduced through the inlet, a cleaning module installed on the exhaust port to spray a fluid pumped by a circulation pump of a neutralization device toward the contaminated gas being discharged, and one or more pall rings installed between the exhaust port and the cleaning module to increase an effective contact area of the contaminated gas and the fluid.

Additionally, in the present disclosure, the body includes a reservoir having the storage part and one or more inlets, and a discharge guide cover coupled on the reservoir, and having the exhaust port and a gas capturing part that slopes up toward the exhaust port.

Additionally, in the present disclosure, the cleaning module includes a housing installed on the gas-liquid contact module, and a spray nozzle block installed on the housing and having one or more spray ports to spray the fluid pumped by the circulation pump of the neutralization device toward the contaminated gas being discharged.

Additionally, in the present disclosure, the cleaning module further includes a fluid spray nozzle block having a nozzle coupling part rotatably coupled below the spray nozzle block, and a plurality of spray nozzles mounted in the nozzle coupling part in a radial direction, each having a spray port to spray the fluid pumped by the circulation pump of the neutralization device toward the contaminated gas being discharged.

Additionally, in the present disclosure, the wet scrubber device further includes a demister installed on the cleaning module to prevent the sprayed fluid from splashing out and separate and remove impurities included in the contaminated gas.

Meanwhile, to achieve the above-described object, a fume hood with a wet scrubber device according to the present disclosure includes the wet scrubber device, a first level sensor which senses a liquid level in a storage part, a pH sensor which senses a fluid acidity in a bottom tank, and a control part which performs control to block the fluid supply to the wet scrubber device when the first level sensor senses the liquid level in the storage part as 'High' according to a preset value, and to supply an acidity adjusting reagent of a neutralizing solution tank to the bottom tank when the pH sensor senses the fluid acidity in the bottom tank and the acidity is outside of a preset value.

According to an embodiment of the present disclosure, a fluid is uniformly sprayed over the entire housing inside through the spray nozzle with the rotation of the nozzle coupling part, thereby increasing a contact ratio of the fluid with contaminated gas and dramatically improving the purification efficiency.

Additionally, the packing member prevents fluid leakage, and a fluid ejected through the spray port of the spray nozzle by the nozzle coupling part cover is stably supplied through the nozzle coupling part while leakage is prevented.

Additionally, a fluid for cleaning contaminated gas is allowed to flow opposite to a flow of contaminated gas, so that the contaminated gas and the fluid cancel out, and a contact ratio increases.

Additionally, contaminated gas introduced through the inlet is primarily cleaned by the first gas-liquid contact module, and then cleaned again by the second gas-liquid contact module, thereby purifying and stabilizing violently poisonous contaminated gas that is highly toxic, flammable and corrosive, to the maximum extent.

Additionally, a fluid extends over a wide area through the spray nozzle, thereby increasing a contact ratio of the fluid with contaminated gas and dramatically improving the purification efficiency.

Additionally, the neutralization device optimized to suit the treatment according to the concentration of alkaline contaminated gas is provided, contributing to the improved gas treatment efficiency of the scrubber device.

Additionally, the wet scrubber device reduces in size, and can be easily installed in benches, fume hoods, reagent markets and safety cabinets.

DETAILED DESCRIPTION

Hereinafter, certain embodiments of the present disclosure will be described in detail through the exemplary drawings. It should be noted that in adding the reference symbols to the elements in each drawing, for identical elements, even though they are indicated in different drawings, they have identical reference symbols as possible. Additionally, in describing the present disclosure, when a certain description of relevant known elements or functions is deemed to make the key subject matter of the present disclosure vague, the detailed description is omitted herein.

Additionally, in describing the elements of the present disclosure, the terms such as "first", "second" A, B, (a), (b) and the like may be used. These terms are only used to distinguish one element from another, and the nature, sequence or order of the corresponding elements is not limited by the terms. It will be understood that when an element is referred to as being "connected to" "connected to", "coupled to" or "linked to" another element, it can be directly "connected", "coupled" or "linked" to the other element or intervening elements may be present.

Figure 1:
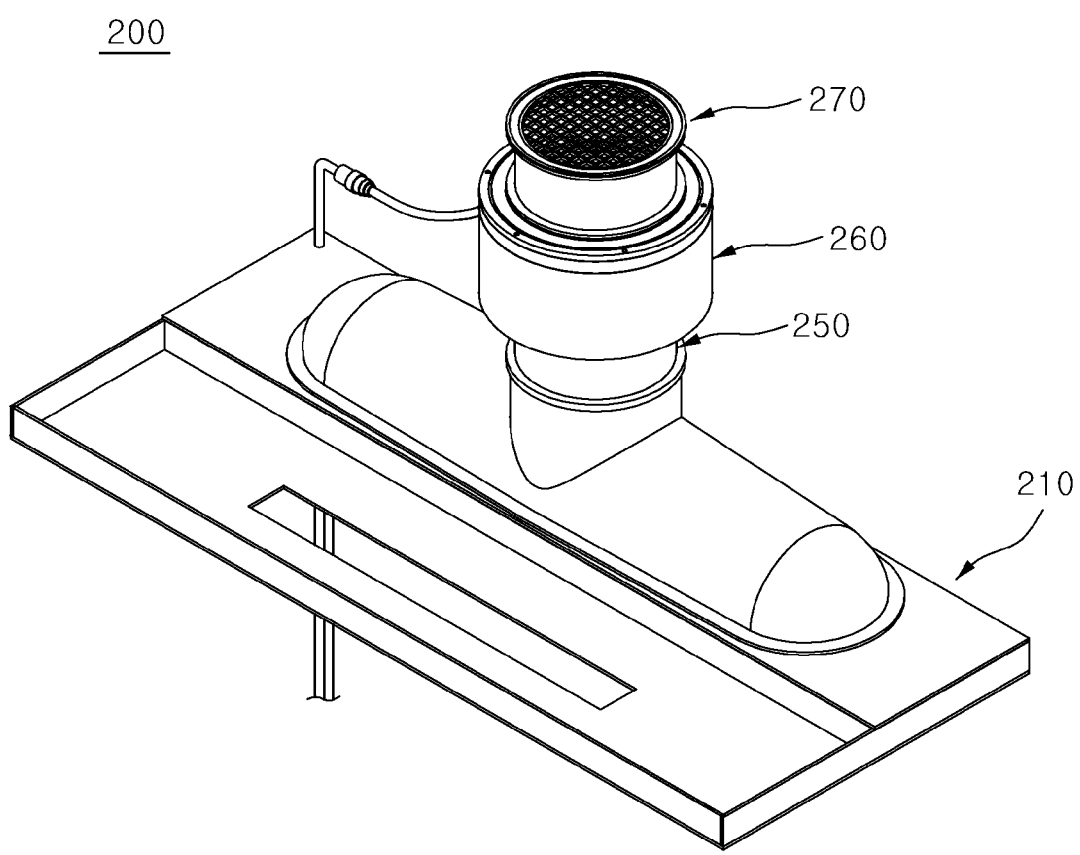
FIG. 1 is a perspective view of a wet scrubber device according to an embodiment of the present disclosure.
Figure 2:
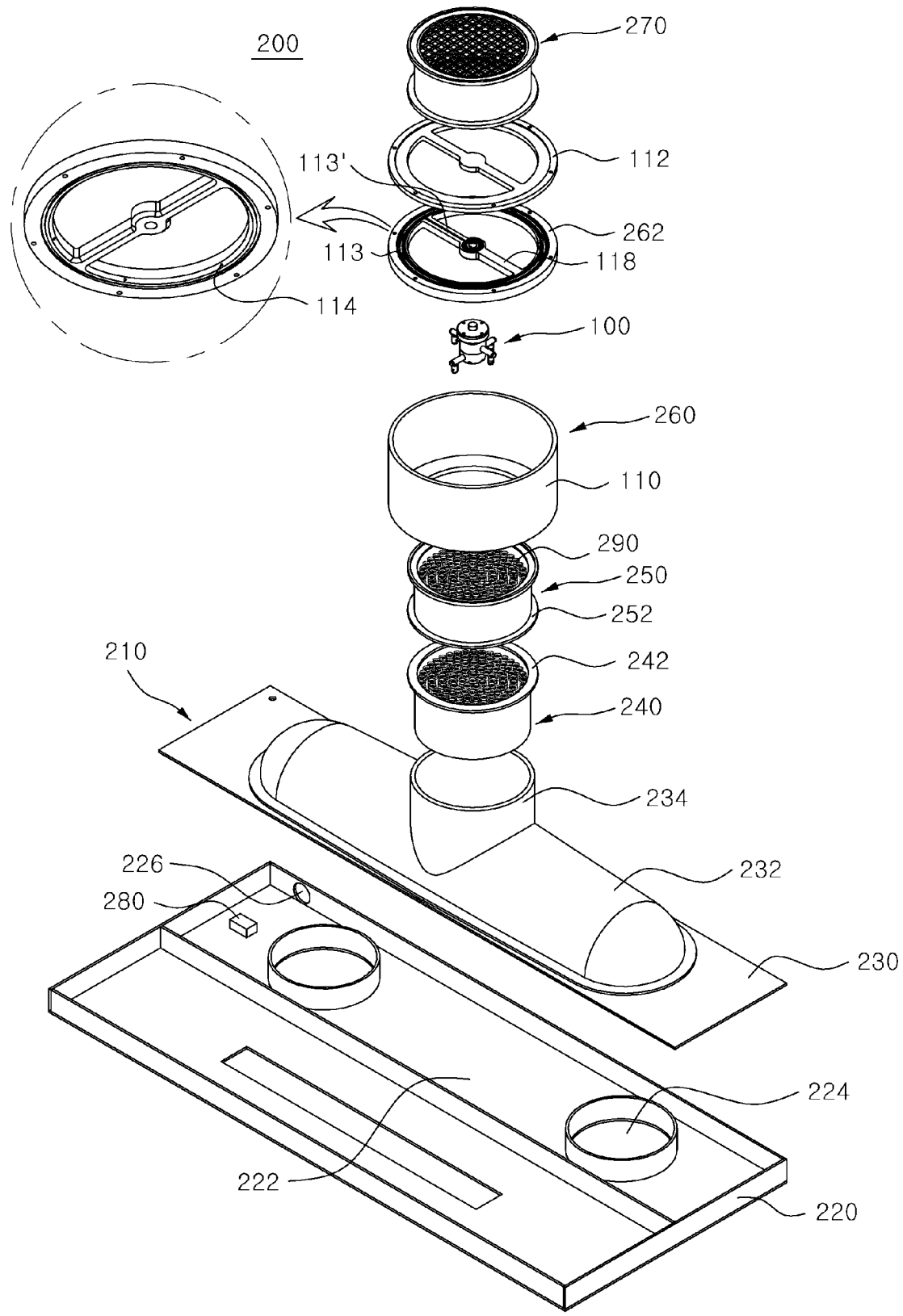
FIG. 2 is an exploded perspective view of a wet scrubber device according to an embodiment of the present disclosure.
Figure 3:
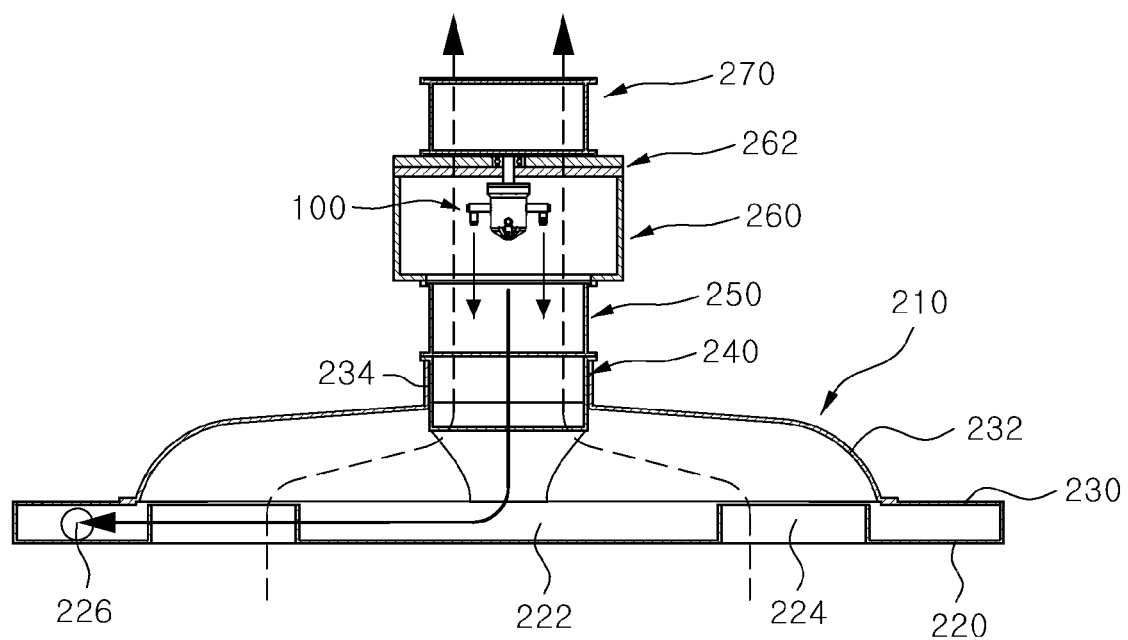
FIG. 3 is a cross-sectional view of a wet scrubber device according to an embodiment of the present disclosure.
Figure 4:
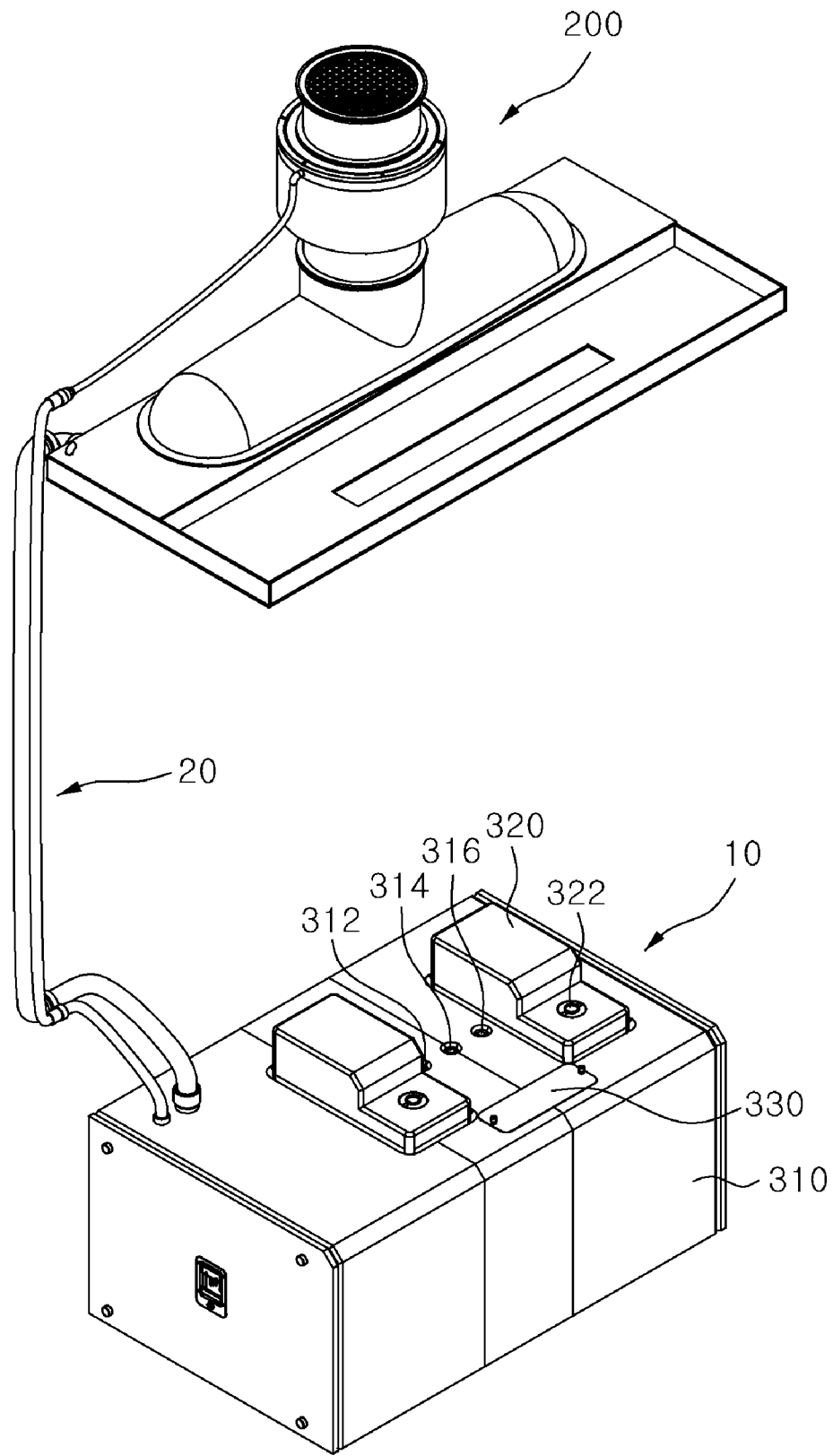
FIGS. 4 and 5 are perspective views of a fume hood with a wet scrubber device according to an embodiment of the present disclosure.
Figure 5:
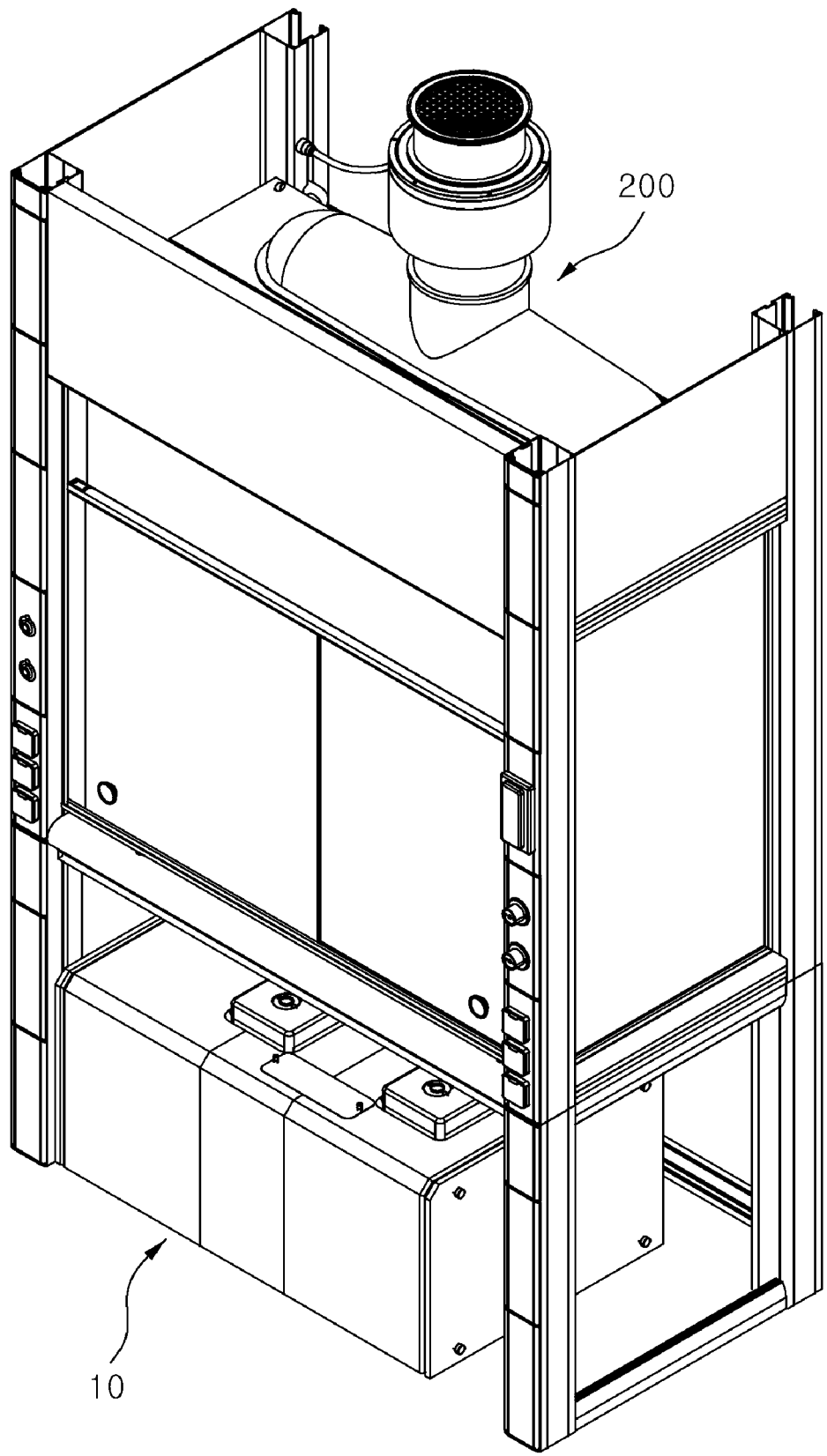
Figure 6:
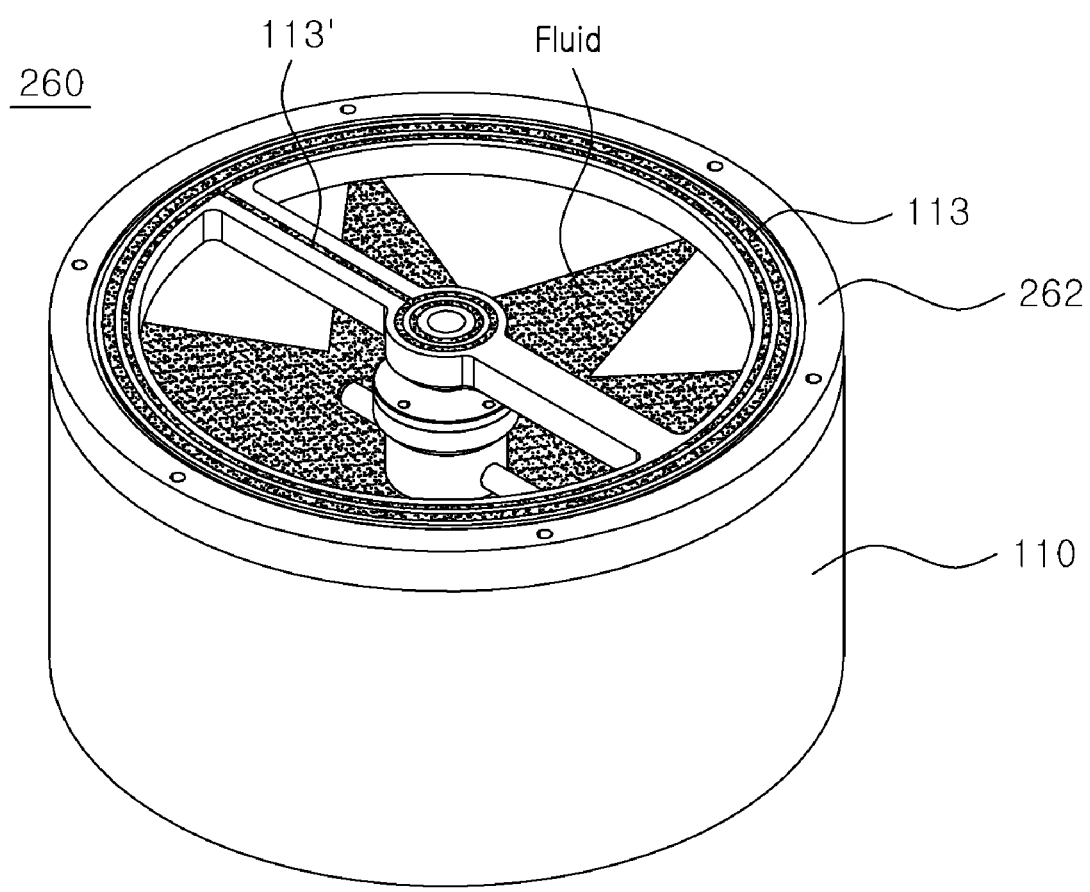
FIG. 6 is a diagram showing a cleaning module of a wet scrubber device according to an embodiment of the present disclosure.
Figure 7:
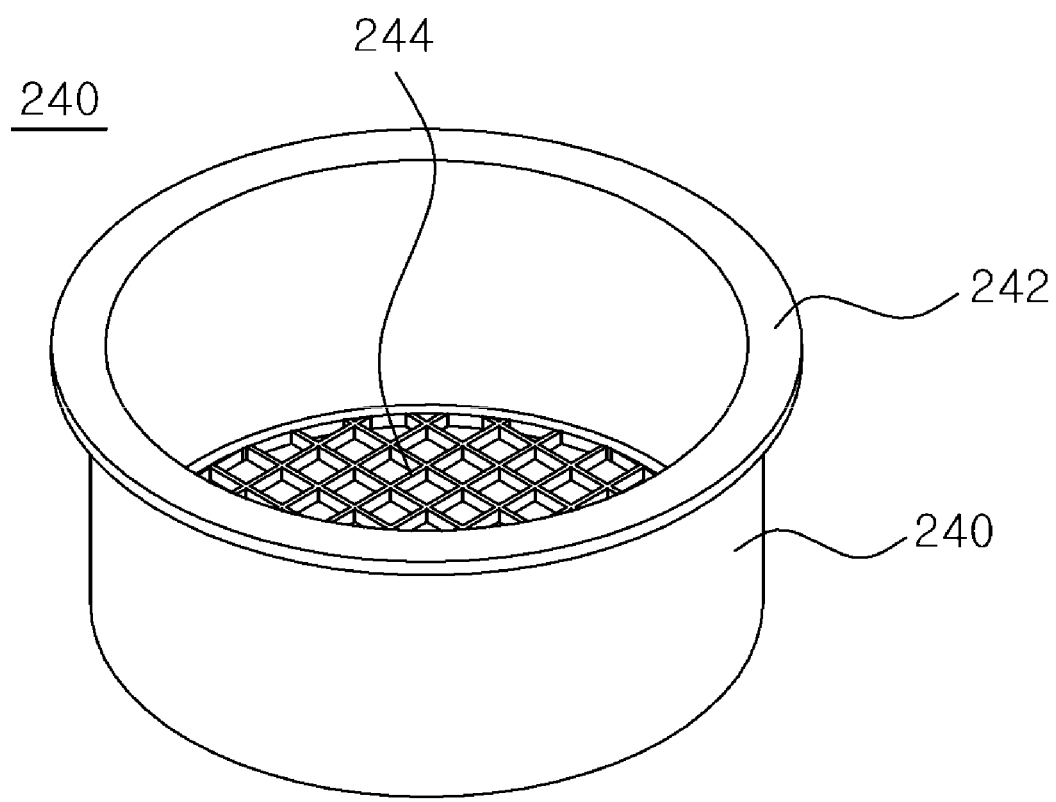
FIG. 7 is a diagram showing a first gas-liquid contact module of a wet scrubber device according to an embodiment of the present disclosure.
Figure 8:
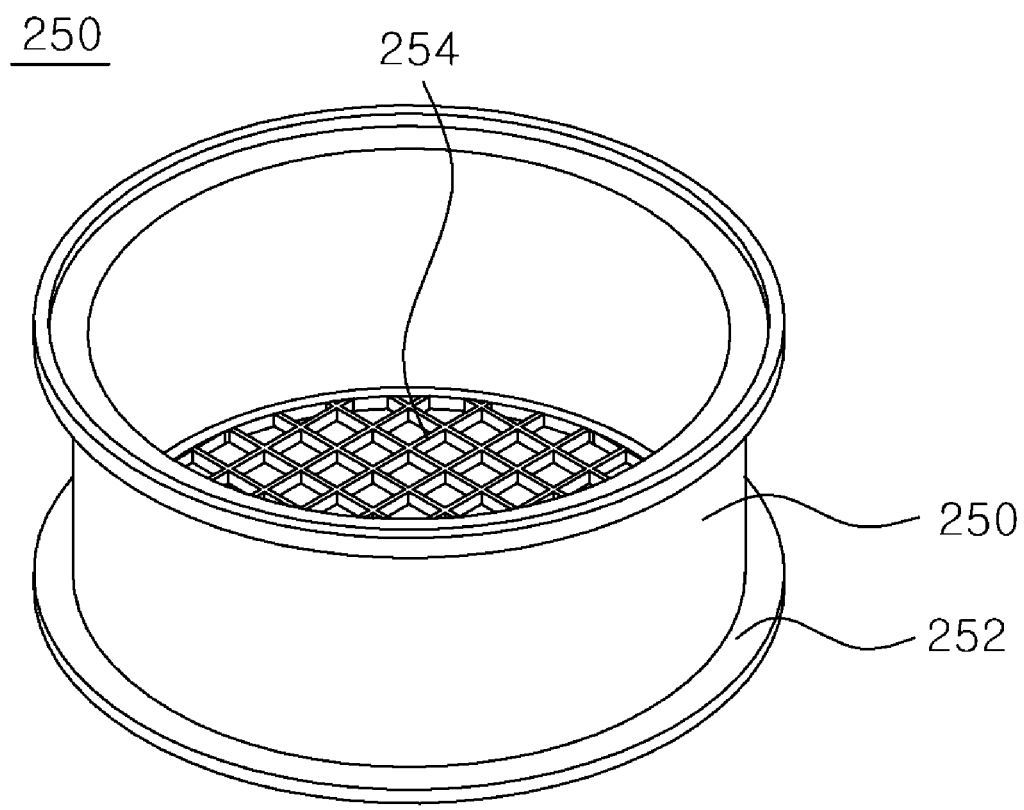
FIG. 8 is a diagram showing a second gas-liquid contact module of a wet scrubber device according to an embodiment of the present disclosure.
Figure 9:
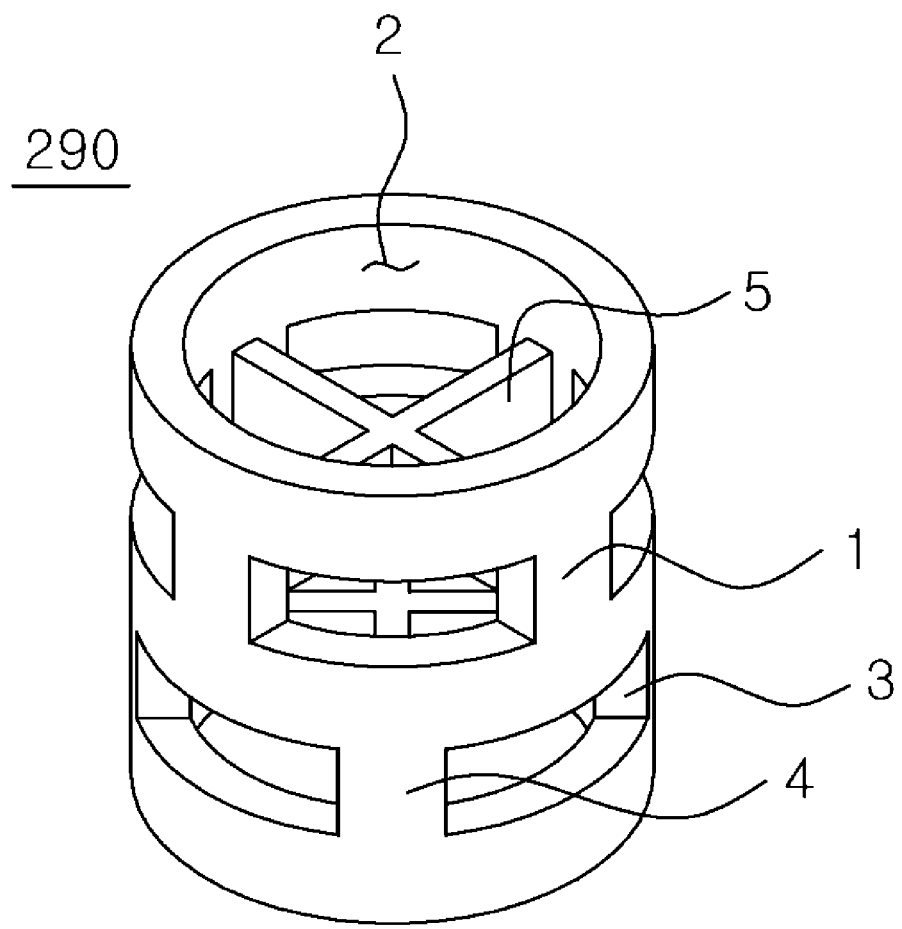
FIG. 9 is a diagram showing a pall ring of a wet scrubber device of a wet scrubber device according to an embodiment of the present disclosure.

FIG. 1 is a perspective view of a wet scrubber device according to an embodiment of the present disclosure, FIG. 2 is an exploded perspective view of the wet scrubber device according to an embodiment of the present disclosure, FIG. 3 is a cross-sectional view of the wet scrubber device according to an embodiment of the present disclosure, FIGS. 4 and 5 are perspective views of a fume hood with the wet scrubber device according to an embodiment of the present disclosure, FIG. 6 is a diagram showing a cleaning module of the wet scrubber device according to an embodiment of the present disclosure, FIG. 7 is a diagram showing a first gas-liquid contact module of the wet scrubber device according to an embodiment of the present disclosure, FIG. 8 is a diagram showing a second gas-liquid contact module of the wet scrubber device according to an embodiment of the present disclosure, and FIG. 9 is a diagram showing a pall ring of the wet scrubber device of the wet scrubber device according to an embodiment of the present disclosure.

As shown in these drawings, the wet scrubber device 200 according to an embodiment of the present disclosure includes: a body 210 having a storage part 222 in which a fluid is collected therein, one or more inlets 224 through which contaminated gas is introduced in the lower part, and an exhaust port 234 to collect and discharge contaminated gas introduced through the inlet 224 in the upper part; a cleaning module 260 installed on the exhaust port 234 to spray the fluid pumped by a circulation pump of a neutralization device 10 toward the contaminated gas being discharged; and gas-liquid contact modules 240, 250 installed between the exhaust port 234 and the cleaning module 260 and having one or more pall rings 290 to increase the effective contact area of the contaminated gas and the fluid.

The wet scrubber device 200 according to the present disclosure includes the body 210, the first gas-liquid contact module 240, the second gas-liquid contact module 250, the cleaning module 260 and a demister 270.

Hereinafter, the body 210, the first gas-liquid contact module 240, the second gas-liquid contact module 250, the cleaning module 260 and the demister 270 will be described in detail.

The body 210 has the storage part 222 in which a fluid is collected therein, and has one or more inlets 224 in the lower part, through which contaminated gas is introduced, and the exhaust port 234 in the upper part to collect and discharge the contaminated gas introduced through the inlet 224.

More specifically, the body 210 includes a reservoir 220 having the storage part 222 in which a fluid is collected therein, and one or more inlets 224 through which contaminated gas is introduced in the lower part; and a discharge guide cover 230 coupled on the reservoir 220, and having the exhaust port 234 to collect and discharge the contaminated gas introduced through the inlet 224 in the upper part, and a gas capturing part 232 sloping up toward the exhaust port 234.

The reservoir 220 is open on the upper part, and has the storage part 222 in which a fluid is collected therein, and one or more inlets 224 in the lower part, through which contaminated gas is introduced.

The discharge guide cover 230 is coupled on the reservoir 220, and has the exhaust port 234 in the upper part to collect and discharge the contaminated gas introduced through the inlet 224, and the gas capturing part 232 sloping up toward the exhaust port 234.

In the present disclosure, the inlet 224 is formed on two sides of the lower part of the reservoir 220, the exhaust port 234 is formed in the middle of the discharge guide cover 230, and the gas capturing part 232 slopes up from two ends of the discharge guide cover 230 toward the exhaust port 234.

Accordingly, contaminated gas introduced through the inlets 224 on two sides is locally collected by the gas capturing part 232 and discharged through the exhaust port 234.

The storage part 222 collects the fluid sprayed through a spray nozzle block 262 and a fluid spray nozzle block 100.

In this instance, the storage part 222 of the reservoir 220 has an outlet 226, and a transport pipe 20 connected with the neutralization device 10 is installed such that it is connected to the outlet 226.

Accordingly, the fluid collected in the storage part 222 is transported to the neutralization device 10 through the transport pipe 20 connected with the outlet 226, and the fluid transported to the neutralization device 10 is pumped by the circulation pump of the neutralization device 10 and sprayed through the spray nozzle block 262 and the fluid spray nozzle block 100.

Additionally, the storage part 222 collects the fluid sprayed through the spray nozzle block 262 and the fluid spray nozzle block 100 again.

The gas-liquid contact module is installed between the exhaust port 234 and the cleaning module 260, and has one or more pall rings 290 to increase the effective contact area of the contaminated gas and the fluid.

Here, the gas-liquid contact module is installed with two ends in communication with the exhaust port 234, and is filled with the pall ring 290 having the porosity of 90% to 98%.

That is, the gas-liquid contact module includes the first gas-liquid contact module 240 in cylindrical shape that is open on top and bottom, having a pall ring support plate 244 formed in the form of a net coupled in the lower part, the first gas-liquid contact module 240 being installed at the upper end of the exhaust port 234 such that it is in communication with the exhaust port 234, and the second gas-liquid contact module 250 in cylindrical shape that is open on top and bottom, having a pall ring support plate 254 formed in the form of a net coupled in the lower part, the second gas-liquid contact module 250 being installed at the upper end of the first gas-liquid contact module 240 such that it is in communication with the first gas-liquid contact module 240, and each is filled with the pall ring 290 having the porosity of 94% to increase the effective contact area of the contaminated gas and the fluid and improve the gas removal efficiency.

Accordingly, contaminated gas introduced through the inlet 224 is primarily cleaned by the first gas-liquid contact module 240, and then cleaned again by the second gas-liquid contact module 250, to purify and stabilize violently poisonous contaminated gas that is highly toxic, flammable and corrosive to the maximum extent.

In the present disclosure, flange parts 242, 252 are each formed at the upper part of the first gas-liquid contact module 240 and the lower part of the second gas-liquid contact module 250, and a fastening member, for example, a bolt, is fastened to the flange parts 242, 252 of the first gas-liquid contact module 240 and the second gas-liquid contact module 250, so that the first gas-liquid contact module 240 and the second gas-liquid contact module 250 are coupled together.

Additionally, the first gas-liquid contact module 240 is inserted into the exhaust port of the discharge guide cover 230, so that the flange parts 242, 252 are supported on the upper end of the exhaust port.

The pall ring 290 has a plurality of through-holes 3 in a body 1 in cylindrical shape having openings 2 on two sides, and a plurality of partitions 5 formed in each spoke part 4 between the though-holes 3.

The cleaning module 260 is installed at the upper end of the second gas-liquid contact module 250 such that it is in communication with the second gas-liquid contact module 250, and includes the spray nozzle block 262 and the fluid spray nozzle block 100 to spray the fluid pumped by the circulation pump of the neutralization device 10 toward contaminated gas being discharged.

More specifically, the cleaning module 260 includes: a housing 110 installed on the gas-liquid contact module; and the spray nozzle block 262 installed in the upper part of the housing 110 and having one or more spray parts 114 to spray the fluid pumped by the circulation pump of the neutralization device 10 toward contaminated gas being discharged; and a nozzle coupling part 130 rotatably coupled below the spray nozzle block 262, and a plurality of spray nozzles 140 mounted in the nozzle coupling part 130 in the radial direction, each having a spray port 144 to spray the fluid pumped by the circulation pump of the neutralization device 10 toward contaminated gas being discharged.

The housing 110 is installed at the upper end of the second gas-liquid contact module 250 such that it is in communication with the second gas-liquid contact module 250, and supports the spray nozzle block 262 and the fluid spray nozzle block 100.

The spray nozzle block 262 has a fluid supply part 113 connected with the transport pipe 20 that supplies the fluid pumped by the circulation pump of the neutralization device 10, and the spray part 114 connected with the fluid supply part 113 to spray the fluid supplied to the fluid supply part 113 into the housing 110.

The fluid supply part 113 is formed in the shape of a groove along the circumferential direction in the upper part of the spray nozzle block 262, and the spray parts 114 are connected with the fluid supply part 113 and spaced apart at a regular interval in the lower part of the spray nozzle block 262 along the circumferential direction, to spray the fluid into the housing 110 in the opposite direction to the contaminated gas movement path.

In this instance, the spray nozzle block 262 includes a cover 112 coupled thereon to close the fluid supply part 113 formed in the shape of a groove along the circumferential direction.

The cover 112 is coupled on the spray nozzle block 262, and closes the fluid supply part 113 formed in the shape of a groove along the circumferential direction.

Accordingly, the spray nozzle block 262 sprays the fluid into the housing 110 through the spray part 114, the fluid that has been pumped by the circulation pump of the neutralization device 10 and supplied to the fluid supply part 113 through the transport pipe 20.

In this instance, the spray parts 114 spaced apart at a regular interval along the circumferential direction in the lower part of the spray nozzle block 262 spray the fluid toward the center of the housing 110 into the shape of a fan, and at the same time, the fluid collides with the walls of the housing 110, and turbulent spray takes place.

As such, the fluid extends to a wide area through the spray nozzle, so the contact ratio of the fluid with the contaminated gas increases and purification efficiency dramatically improves.

In addition, the spray nozzle block 262 has a support part 118 in which the fluid spray nozzle block 100 is installed, and the support part 118 has a fluid supply part or a support part inside waterway 113' that is in communication with a water supply channel 122 of the fluid spray nozzle block 100.

Accordingly, the fluid supplied to the fluid supply part 113 through the transport pipe 20 is sprayed into the housing 110 through the fluid spray nozzle block 100.

Dissimilar to this, the housing 110 may have the support part 118 in which the fluid spray nozzle block 100 is installed, and the support part 118 may have the support part inside waterway 113' that is in communication with the water supply channel 122 of the fluid spray nozzle block 100.

That is, the fluid supplied through the transport pipe 20 may be supplied to each of the fluid supply part 113 of the spray nozzle block 262 and the support part inside waterway 113' of the support part 118, and sprayed into the housing 110 through the spray part 114 of the spray nozzle block 262 and the spray nozzle 140 of the fluid spray nozzle block 100.

The demister 270 is installed at the upper end of the cleaning module 260 in the shape of a wire mat such that it is in communication with the cleaning module 260 to prevent the fluid sprayed through the spray nozzle block 262 and the fluid spray nozzle block 100 from splashing out, and to separate, remove and discharge impurities of contaminated gas introduced through the cleaning module 260.

That is, when contaminated gas introduced from the cleaning module 260 turns into bubbles, causing fine liquid particles to rise, the fine liquid particles are carried in gas and pass through the demister 270.

Before passing through, fine liquid particles (volume) become larger by inertia collision on the PAD surface, particles including impurities fall freely by the weight, and gas containing gas or liquid substances having passed through turn into clear gas completely free from impurities and passes through the demister 270.

That is, the demister 270 prevents the sprayed fluid from splashing, and at the same time, acts as a filter to separate and remove impurities (MIST or DUST) included in contaminated gas.

By this structure, the wet scrubber device allows the fluid for cleaning contaminated gas to flow opposite to the flow of contaminated gas, so that the contaminated gas and the fluid cancel out, and a contact ratio increases.

A first level sensor 280 senses the liquid level in the storage part 222, a pH sensor 312 senses the fluid acidity in a bottom tank 310, a second level sensor 314 and a third level sensor 316 sense the liquid level in the bottom tank 310, and a fourth liquid level sensor 322 senses the liquid level in a neutralizing solution tank 320.

When the first level sensor 280 senses the liquid level in the storage part 222 as 'High' according to a preset value, a control part 330 blocks the fluid supply to the wet scrubber device 200.

Additionally, the pH sensor 312 senses the fluid acidity in the bottom tank 310, and when the acidity is outside of the set value, the control part 330 supplies an acidity adjusting reagent in the neutralizing solution tank 320 to the bottom tank 310.

Additionally, when the second level sensor 314 senses the liquid level in the bottom tank 310 as 'High' according to a preset value, the control part 330 outputs 'High' to a display part or an audio output part and blocks the fluid supply, and when the third level sensor 316 senses the liquid level in the bottom tank 310 as 'Medium' or 'Low' according to a preset value, outputs one of 'Medium' and 'Low' to the display part or the audio output part and supplies water.

Additionally, when the fourth level sensor 322 senses the liquid level in the neutralizing solution tank 320 as 'Low', the control part 330 outputs 'Low' to the display part or the audio output part according to a preset value to give warning that it is in need of neutralizing solution supply.

Accordingly, a user can know the liquid level in the bottom tank 310 through the display part or the audio output part.

When the acidity in the bottom tank 310 is outside of the set value, the neutralization device 10 of the present disclosure configured as described above continually refills the bottom tank 310 with the neutralizing solution in the neutralizing solution tank 320, to always uniformly maintain the acidity of the fluid sprayed from the spray nozzle block 262 and the fluid spray nozzle block 100.

Figure 10:
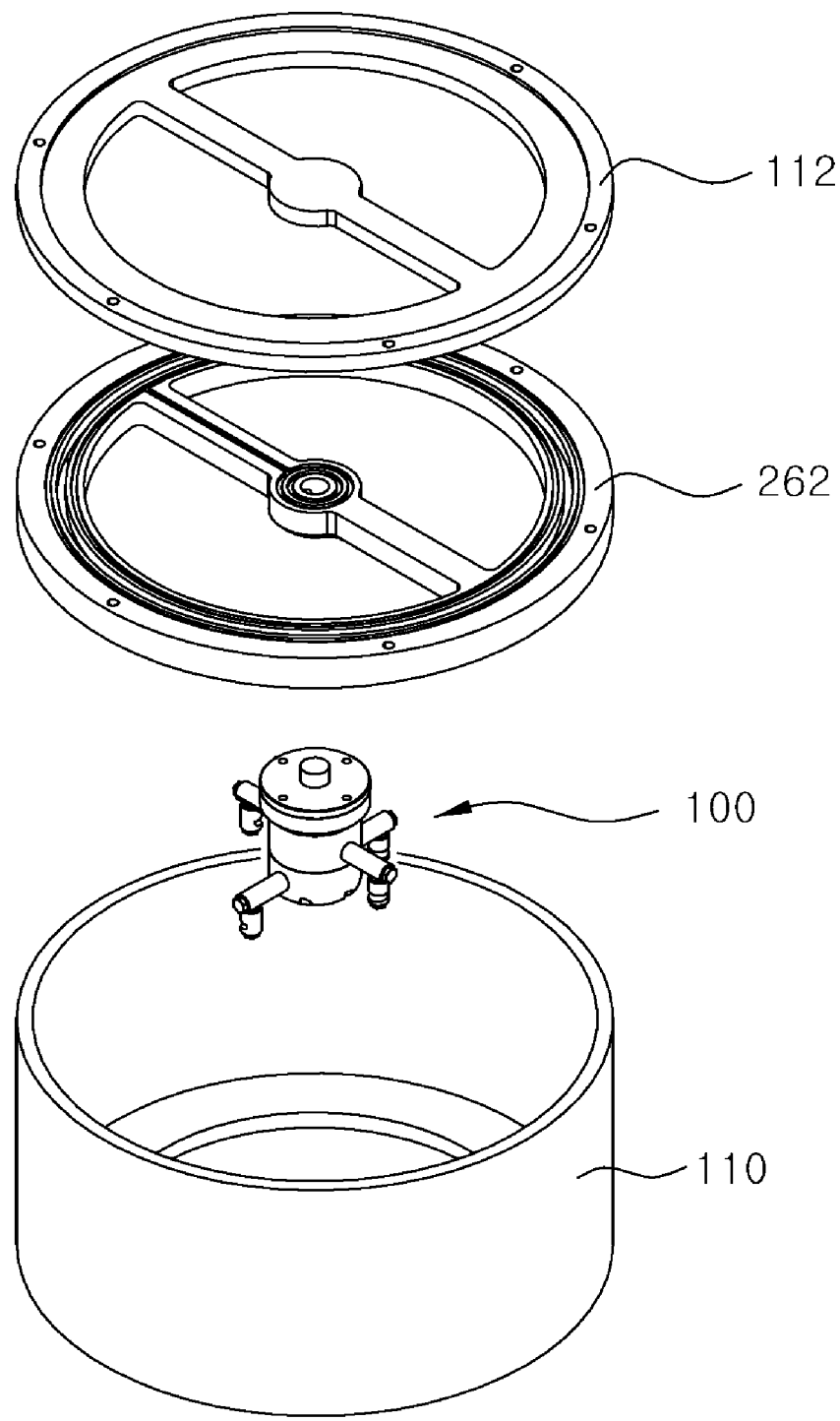
FIG. 10 is a perspective view of a nozzle block according to an embodiment of the present disclosure.
Figure 11:
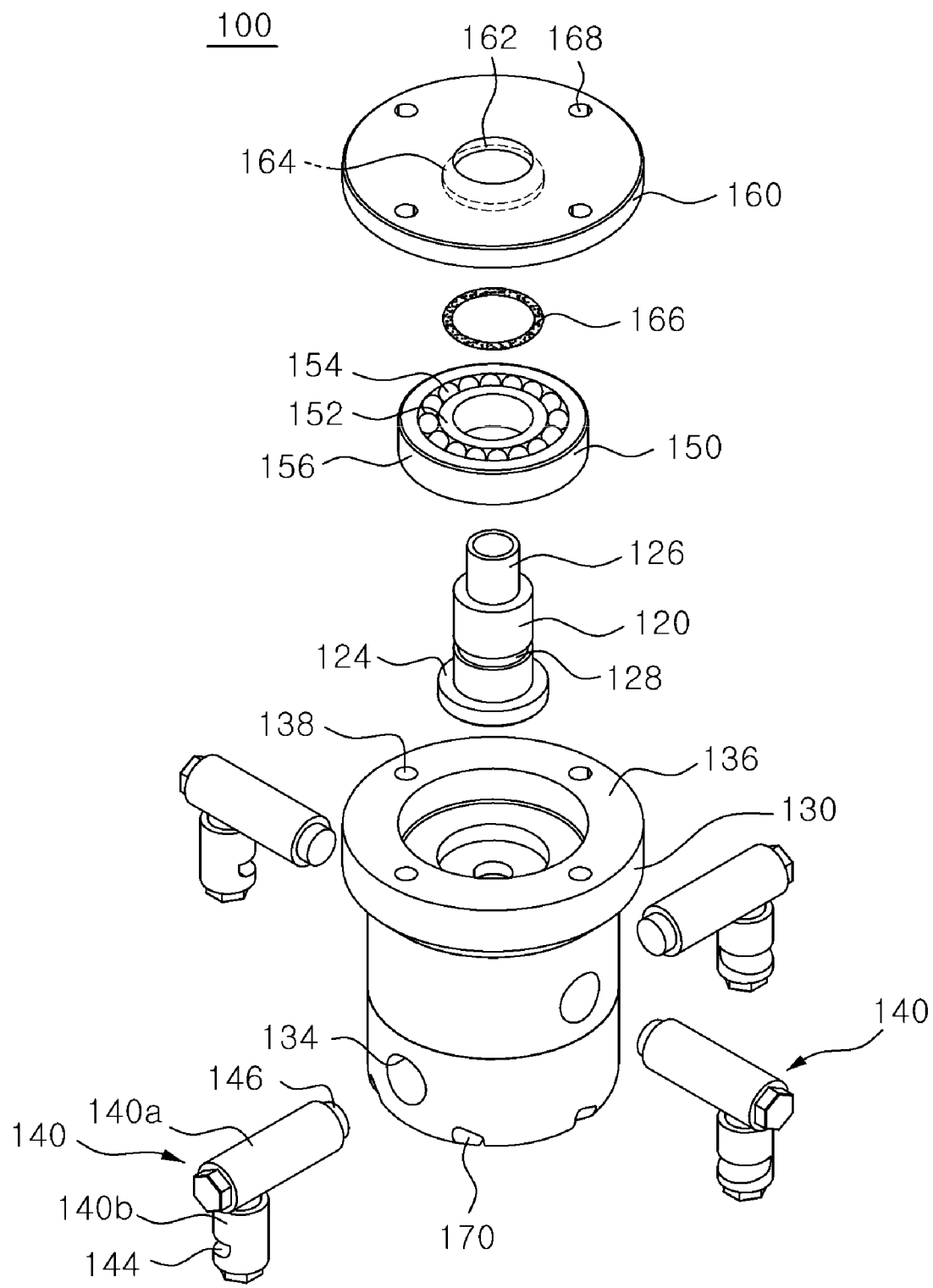
FIG. 11 is an exploded perspective view of a fluid spray nozzle block according to an embodiment of the present disclosure.
Figure 12:
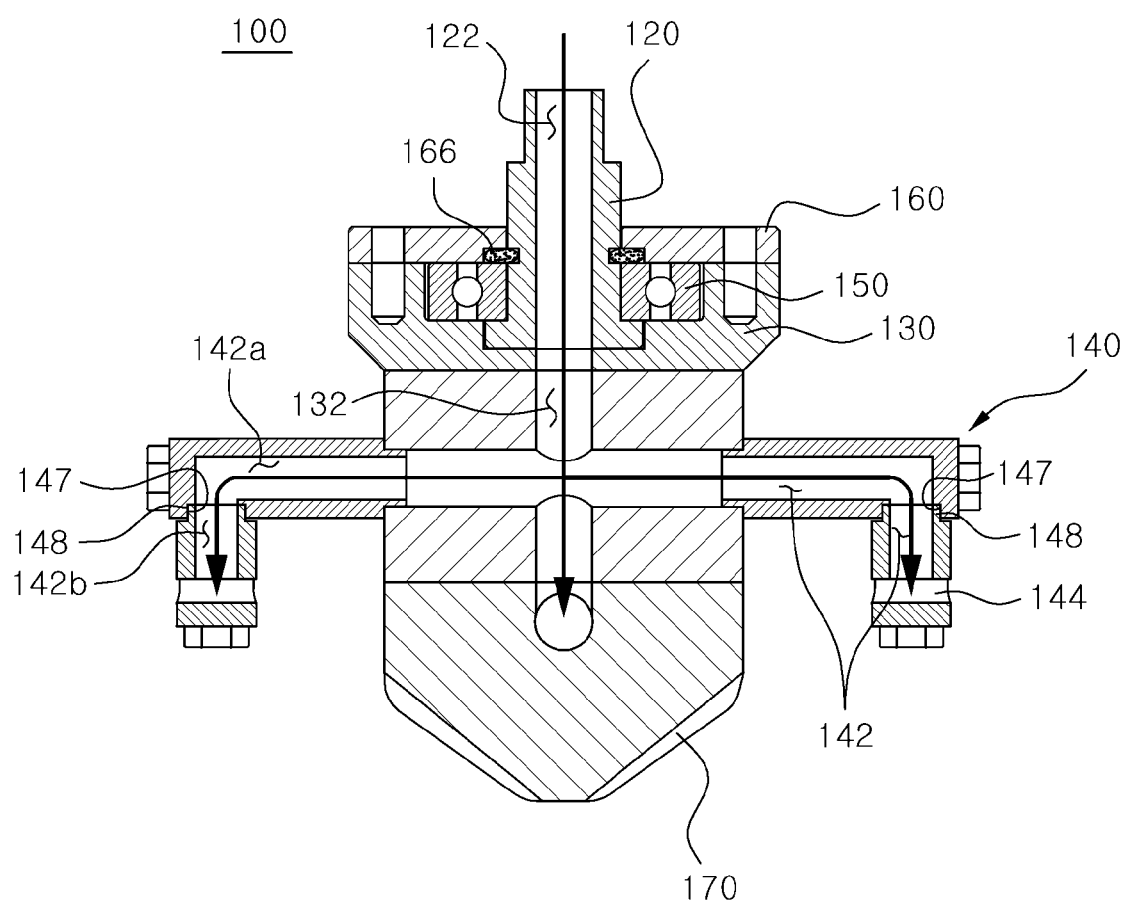
FIG. 12 is a cross-sectional view of a fluid spray nozzle block according to an embodiment of the present disclosure.
Figure 13:
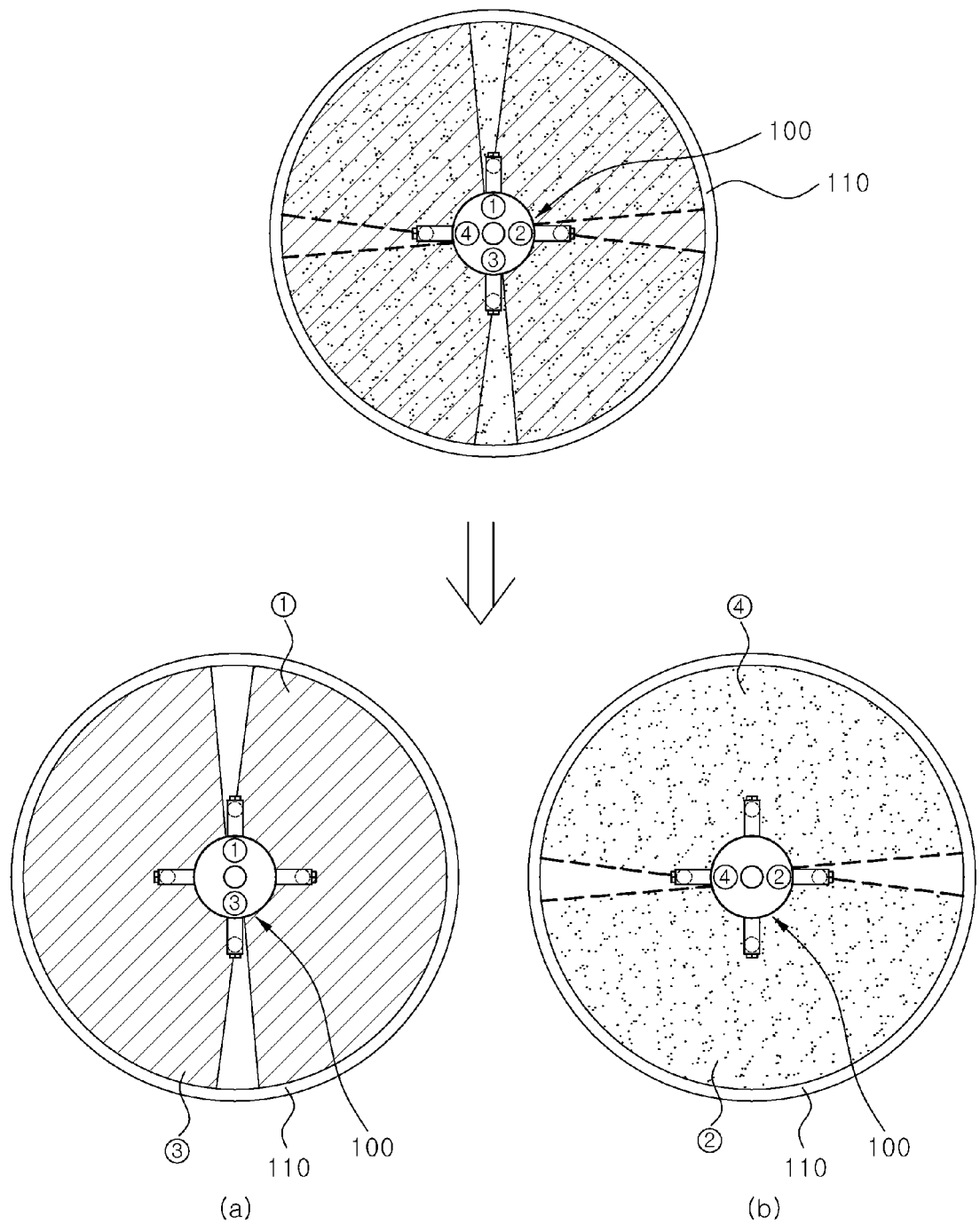
FIGS. 13 and 14 are usage diagrams of a fluid spray nozzle block according to an embodiment of the present disclosure.
Figure 14:
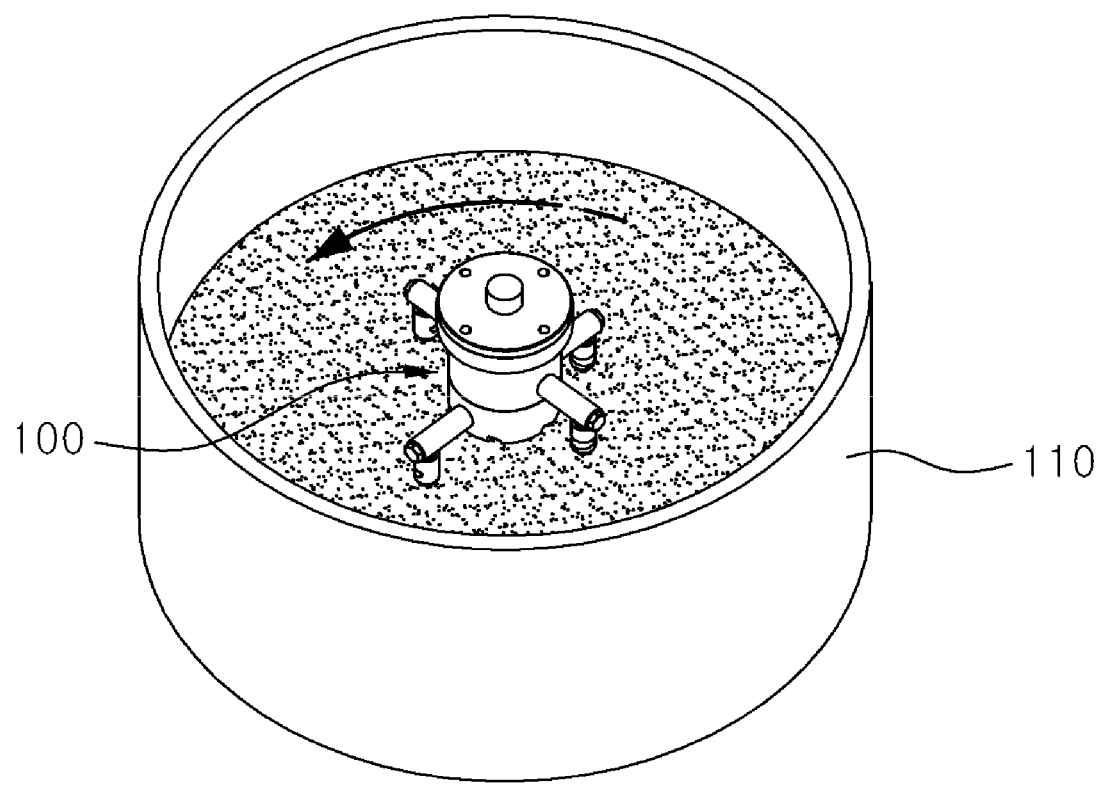
Figure 15:
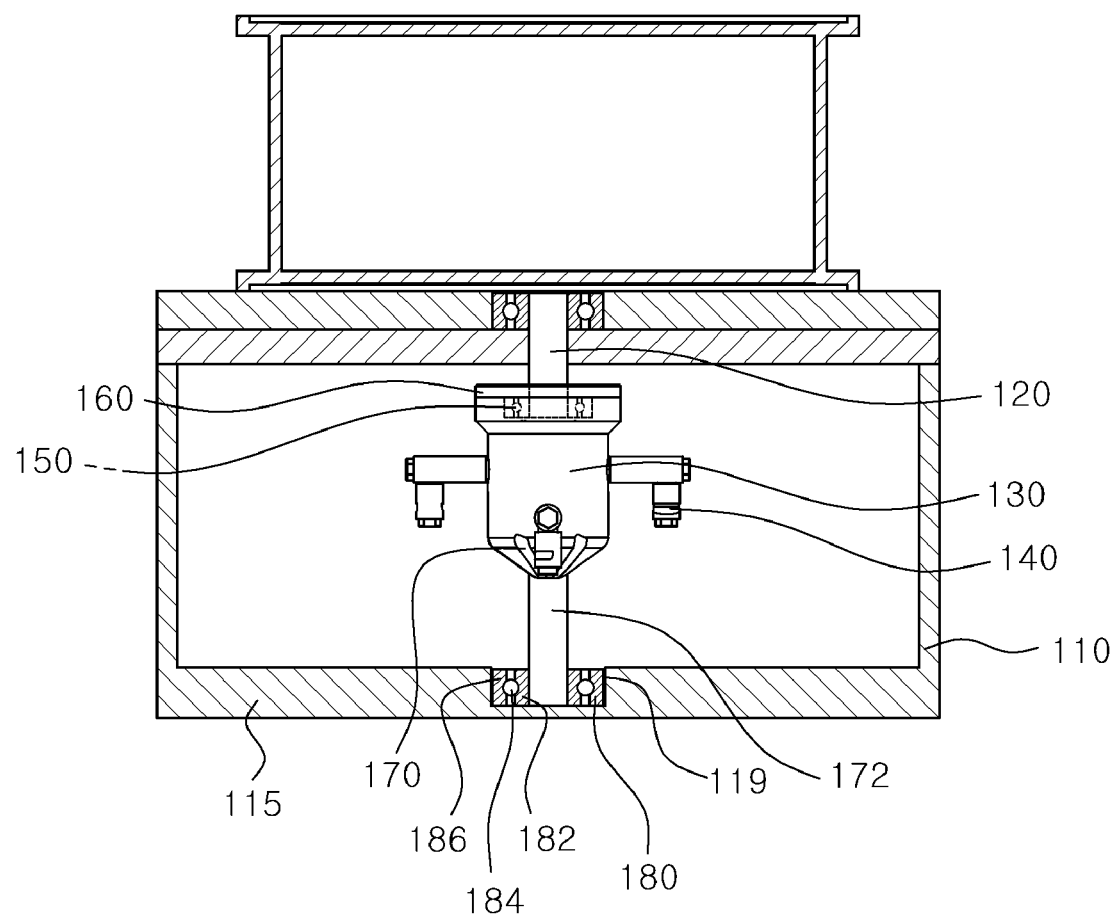
FIG. 15 is an exploded cross-sectional view of a fluid spray nozzle block according to another embodiment of the present disclosure.

FIG. 10 is a perspective view of the nozzle block according to an embodiment of the present disclosure, FIG. 11 is an exploded perspective view of the fluid spray nozzle block according to an embodiment of the present disclosure, FIG. 12 is an exploded cross-sectional view of the fluid spray nozzle block according to an embodiment of the present disclosure, FIGS. 13 and 14 are usage diagrams of the fluid spray nozzle block according to an embodiment of the present disclosure, and FIG. 15 is an exploded cross-sectional view of a fluid spray nozzle block according to another embodiment of the present disclosure.

As shown in these drawings, the fluid spray nozzle block 100 according to an embodiment of the present disclosure includes: a support axis 120 coupled to the inside of the housing 110 and having the water supply channel 122 connected with the fluid supply part 113 to transport the fluid supplied from the fluid supply part 113; a nozzle coupling part 130 rotatably coupled to the lower end of the support axis 120, and having a fluid movement passage 132 that is in communication with the water supply channel 122 to transport the fluid; and the plurality of spray nozzles 140 mounted in the nozzle coupling part 130 in the radial direction, and having a spray passage 142 that is in communication with the fluid movement passage 132 to transport the fluid, and the spray port 144 to spray out the fluid in the spray passage 142, and a spray propulsive force is generated by the fluid sprayed through the spray nozzle 140 and the nozzle coupling part 130 rotates in one direction or opposite directions.

The fluid spray nozzle block 100 according to the present disclosure includes the support axis 120, the nozzle coupling part 130, a nozzle coupling part cover 160 and the spray nozzle 140.

Hereinafter, the support axis 120, the nozzle coupling part 130, the nozzle coupling part cover 160 and the spray nozzle 140 will be described in detail.

The support axis 120 is connected with the fluid supply part 113 to form the water supply channel 122 for transporting the fluid supplied from the fluid supply part 113.

Additionally, the support axis 120 is coupled to the housing 110 such that it is disposed in the housing 110 or is coupled to the support part 118 of the spray nozzle block 262, and has a linking part 126 linked to the support part 118 in the upper part, a step part 124 in the lower part, on which an inner wheel 152 of an upper friction reducing member 150 is supported, and has, in the intermediate part, an insertion groove 128 in the circumferential direction on the outer circumferential surface, into which a packing member 166 is inserted.

The support axis 120 is coupled to the support part 118 by an interference fit such that the fluid supply part 113 and the water supply channel 122 are in communication with each other.

The packing member 166 is inserted into the insertion groove 128 of the support axis 120 and a receiving groove 164 of the nozzle coupling part cover 160 to prevent the fluid from leaking, and fixes the inner wheel 152 of the upper friction reducing member 150.

The nozzle coupling part 130 is rotatably coupled to the lower end of the support axis 120, and has the fluid movement passage 132 that is in communication with the water supply channel 122 to transport the fluid.

In this instance, the nozzle coupling part 130 has, in the upper part, a flange part 136 with one or more linking holes 138 to which the nozzle coupling part cover 160 is coupled, and has, in the lower part, a rotation inducing unit 170 that rotates by the rising air currents of contaminated gas discharged through the housing 110, and a linking hole 134 to which the spray nozzle 140 is coupled on the outer circumferential surface.

The rotation inducing unit 170 slopes at the same inclination angle as the rotation direction radially from the center axis part at the lower end so that it rotates by the rising air currents of contaminated gas discharged through the housing 110, and a plurality of rotation inducing unit 170 is spaced apart at a regular interval along the circumferential direction.

A linking hole 134 is formed through such that it is in communication with the fluid movement passage 132, and a plurality of linking hole 134 is spaced apart at a regular interval along the circumferential direction on the outer circumferential surface of the nozzle coupling part 130, and spaced apart with a height difference vertically from adjacent linking holes 134.

That is to say, because the linking holes 134 are spaced apart with a height difference vertically, the spray nozzle 140 sprays the fluid while rotating, forming a plurality of perfect circular plate-type water membranes, thereby achieving double purification of contaminated gas.

The spray nozzles 140 are each coupled to the plurality of linking holes 134 and mounted in the nozzle coupling part 130 in the radial direction, and one or more spray nozzles 140 are installed to spray the fluid through the spray port 144.

The spray nozzle 140 has the spray passage 142 that is in communication with the fluid movement passage 132 to transport the fluid, and the spray port 144 to spray out the fluid in the spray passage 142.

The spray nozzle 140 includes a connector part 140a coupled to the nozzle coupling part 130 in the longitudinal direction, and a nozzle part 140b having the spray port 144 and which is coupled below the connector part 140a approximately perpendicular to the connector part 140a.

The connector part 140a has a spray passage 142a that is in communication with the fluid movement passage 132 to transport the fluid, a linking part 146 that is coupled to the linking hole 134 of the nozzle coupling part 130 on one side, and a linking hole 147 to which a linking part 148 of the nozzle part 140b is coupled in the lower part of the other side.

The nozzle part 140b has the spray passage 142b that is in communication with the spray passage 142a to transport the fluid, the linking part 148 coupled to the linking hole 147 of the connector part 140a in the upper part, and the spray port 144 that sprays out the fluid in the spray passage 142b in the lower part.

In the present disclosure, the spray nozzle 140 has a structure in which the nozzle part 140b is detachably coupled, and when impurities are built, can easily separate and remove the impurities.

The spray port 144 is formed in the side direction of the nozzle part 140b to spray the fluid in the shape of a fan, and the spray angle of the fluid sprayed in the shape of a fan ranges from 128° up to 153° depending on the water pressure.

Additionally, the direction in which the spray port 144 sprays the fluid is a direction perpendicular to the lengthwise direction of the nozzle part 140b, and the nozzle coupling part 130 can freely rotate by the spray force of the fluid sprayed through the spray port 144.

That is, a spray propulsive force occurs by the fluid sprayed through the spray nozzle 140 so that the nozzle coupling part 130 rotates in one direction or opposite direction.

More specifically, when the fluid pressed by the pump of the neutralization device 10 is supplied to the fluid spray nozzle block 100 through the transport pipe 20, the fluid is sprayed through the plurality of spray ports 144, and in this instance, the spray force of the fluid sprayed out through the spray port 144 acts on the nozzle coupling part 130, so that the rotational force occurs in the nozzle coupling part 130, and the spray nozzle 140 mounted in the nozzle coupling part 130 sprays the fluid while rotating. In this instance, the spray nozzles 140 disposed at the same height are arranged such that they form a perfect circular plate-shaped water membrane during rotation.

The nozzle coupling part cover 160 is coupled to the nozzle coupling part 130, surrounding the friction reducing member, to allow the fluid supplied from the fluid supply part 113 to move to the spray nozzle 140 while preventing leakage.

The nozzle coupling part cover 160 has a linking hole 162 through which the support axis 120 passes, the receiving groove 164 into which the packing member 166 is inserted with the extended diameter of the linking hole 162 below the linking hole 162, and a though-hole 168 at a corresponding location with the linking hole 138 formed in the flange part 136 of the nozzle coupling part 130.

Accordingly, when the nozzle coupling part cover 160 is linked with the nozzle coupling part 130, the support axis 120 passes through the linking hole 162, and the packing member 166 is inserted into the receiving groove 164 and linked to the linking hole 138 formed in the flange part of the nozzle coupling part 130 by a fastening member, for example, a bolt, passing through the though-hole 168.

The upper friction reducing member 150 is interposed between the support axis 120 and the nozzle coupling part 130 to fix the position of the nozzle coupling part 130 while supporting the rotating nozzle coupling part 130, and has a structure in which a plurality of rolling members 154 is inserted between the inner wheel 152 and an outer wheel 156 to reduce friction.

The inner wheel 152 of the upper friction reducing member 150 is inserted into the support axis 120 and supported on the step part 124, and the outer wheel 156 is inserted into the receiving groove 164 of the nozzle coupling part 130 and supported on the nozzle coupling part 130 and the nozzle coupling part cover 160.

In this instance, a position fixing part 172 is formed at the lower end of the nozzle coupling part 130, a support part 115 is formed in the lower part of the housing 110, and the position fixing part 172 is supported on the support part 115 by the medium of a lower friction reducing member 180.

The lower friction reducing member 180 is interposed between the support part 115 formed in the lower part of the housing 110 and the position fixing part 172 of the nozzle coupling part 130 to fix the position of the nozzle coupling part 130 while supporting the rotating nozzle coupling part 130, and has a structure in which a plurality of rolling members 184 is inserted between an inner wheel 182 and an outer wheel 186 to reduce friction.

The inner wheel 182 of the lower friction reducing member 180 surrounds the position fixing part 172, and the outer wheel 186 is inserted into a receiving groove 119 formed in the support part 115 of the housing 110.

As described above, the upper friction reducing member 150 and the lower friction reducing member 180 are provided to fix the position of the nozzle coupling part 130 while supporting the rotating nozzle coupling part 130.

Although all elements of the embodiments of the present disclosure have been hereinabove described as being combined into one or operate in combination, the present disclosure is not necessarily limited to these embodiments. That is, all the elements may operate in selective combination of at least one of them within the intended scope of the present disclosure.

Additionally, it should be understood that the term "comprising", "including" or "having" hereinabove used specifies the presence of stated elements, but does not preclude the presence or addition of one or more other elements. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

The foregoing description is provided to describe the technical idea of the present disclosure for illustration purposes only, and it is obvious to those having ordinary skill in the art that various modifications and variations may be made thereto without departing from the essential features of the present disclosure. Accordingly, the embodiments disclosed herein are provided to describe, but not intended to limit, the technical idea of the present disclosure, and the scope and spirit of the present disclosure is not limited by these embodiments. The present disclosure should be interpreted by the accompanying claims, and it should be interpreted that the equivalents to the technical spirit of the present disclosure fall within the spirit scope of the present disclosure.

The invention claimed is:

1. A nozzle block, comprising:
   a support axis coupled to an inside of a housing, and having a water supply channel connected with a fluid supply part to transport a fluid supplied from the fluid supply part;
   a nozzle coupling part rotatably coupled to a lower end of the support axis, and having a fluid movement passage that is in communication with the water supply channel to transport the fluid;
   a plurality of spray nozzles mounted in the nozzle coupling part in a radial direction, and having a spray passage that is in communication with the fluid movement passage to transport the fluid, and a spray port to spray out the fluid in the spray passage; and
   an upper friction reducing member interposed between the support axis and the nozzle coupling part to fix a position of the nozzle coupling part while supporting the rotating nozzle coupling part,
   wherein a spray propulsive force is generated by the fluid sprayed through the spray nozzle so that the nozzle coupling part rotates in one direction or opposite direction.

2. The nozzle block according to claim 1, further comprising:
   a nozzle coupling part cover coupled to the nozzle coupling part, surrounding the friction reducing member, to allow the fluid supplied from the fluid supply part to move to the spray nozzle while preventing leakage.

3. The nozzle block according to claim 1, wherein the nozzle coupling part has a plurality of rotation inducing parts at a lower end, the rotation inducing parts being spaced apart along a circumferential direction and sloping at a same inclination angle as a rotation direction radially from a center axis part to rotate by rising air currents of contaminated gas discharged through the housing.

4. The nozzle block according to claim 1, further comprising:

a lower friction reducing member interposed between the housing and the nozzle coupling part to fix a position of the nozzle coupling part while supporting the rotating nozzle coupling part.

5. A nozzle block comprising:

a support axis coupled to an inside of a housing, and having a water supply channel connected with a fluid supply part to transport a fluid supplied from the fluid supply part;

a nozzle coupling part rotatably coupled to a lower end of the support axis, and having a fluid movement passage that is in communication with the water supply channel to transport the fluid; and a plurality of spray nozzles mounted in the nozzle coupling part in a radial direction, and having a spray passage that is in communication with the fluid movement passage to transport the fluid, and a spray port to spray out the fluid in the spray passage; and wherein a spray propulsive force is generated by the fluid sprayed through the spray nozzle so that the nozzle coupling part rotates in one direction or opposite direction; and the nozzle coupling part has a plurality of rotation inducing parts at a lower end, the rotation inducing parts being spaced apart along a circumferential direction and sloping at a same inclination angle as a rotation direction radially from a center axis part to rotate by rising air currents of contaminated gas discharged through the housing.

6. A nozzle block comprising:

a support axis coupled to an inside of a housing, and having a water supply channel connected with a fluid supply part to transport a fluid supplied from the fluid supply part;

a nozzle coupling part rotatably coupled to a lower end of the support axis, and having a fluid movement passage that is in communication with the water supply channel to transport the fluid;

a plurality of spray nozzles mounted in the nozzle coupling part in a radial direction, and having a spray passage that is in communication with the fluid movement passage to transport the fluid, and a spray port to spray out the fluid in the spray passage; and a lower friction reducing member interposed between the housing and the nozzle coupling part to fix a position of the nozzle coupling part while supporting the rotating nozzle coupling part, wherein a spray propulsive force is generated by the fluid sprayed through the spray nozzle so that the nozzle coupling part rotates in one direction or opposite direction.

* * * * *